United States Patent [19]

Lin

[11] 3,907,805

[45] Sept. 23, 1975

[54] PREPARATION OF QUINACRIDONES BY VAPOR PHASE DEHYDROGENATION OF DIHYDROQUINACRIDONES

[75] Inventor: Keh-Kuang Lin, Newark, Del.

[73] Assignee: E. I. Du Pont de Nemours and Company, Wilmington, Del.

[22] Filed: Dec. 20, 1973

[21] Appl. No.: 426,472

[52] U.S. Cl. ........................... 260/279 R; 106/288 Q
[51] Int. Cl.² .......................................... C09B 48/00
[58] Field of Search............. 260/279 R; 106/288 Q

[56] References Cited
UNITED STATES PATENTS

| | | | |
|---|---|---|---|
| 2,821,529 | 1/1958 | Struve | 260/279 R |
| 3,133,071 | 5/1964 | Nelson | 260/279 R |
| 3,272,821 | 9/1966 | Schweizer | 260/279 R |

FOREIGN PATENTS OR APPLICATIONS

| | | | |
|---|---|---|---|
| 166,795 | 12/1964 | U.S.S.R. | 260/279 R |

*Primary Examiner*—Donald G. Daus
*Assistant Examiner*—Diana G. Rivers

[57] ABSTRACT

A vapor phase process for preparing quinacridone pigment involing heating at least one 6,13-dihydroquinacridone to at least the sublimation temperature thereof in the presence of a gaseous mixture inert to the dihydroquinacridone and the quinacridone. This process provides for high yields of quinacridones having pigmentary quality.

11 Claims, 1 Drawing Figure

PREPARATION OF QUINACRIDONES BY VAPOR PHASE DEHYDROGENATION OF DIHYDROQUINACRIDONES

BACKGROUND OF THE INVENTION

Quinacridones are commonly prepared by three general methods, i.e., (1) cyclization of 2,5-diarylaminoterephthalic acids, (2) oxidation of dihydroquinacridones, and (3) reduction of quinacridonequinones, described in Chem. Rev., Vol. 67, No. 1, Labana et al., *Quinacridones*, pp. 3–5. Many embodiments of these general methods exist, however the reactions are conducted almost exclusively in the liquid phase.

A vapor phase preparation of quinacridone is described in commonly assigned case, Ser. No. 426,473, filed concurrently, and now abandoned. The case discloses a process for preparing quinacridone by oxidizing dihydroquinacridone at high temperatures with molecular oxygen.

The process of this invention eliminates the need for expensive reactants and solvents associated with liquid phase preparations of quinacridones.

SUMMARY OF THE INVENTION

This invention provides for a vapor phase process for preparing quinacridone pigment by heating at least one 6,13-dihydroquinacridone of the general formula

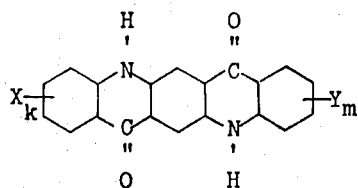

where X and Y are radicals selected from the group consisting of F, Cl, Br, alkyl having 1 to 3 carbon atoms, and alkoxy having 1 to 3 carbon atoms, or combinations thereof, and $k$ and $m$ are integers from 0 to 2, inclusive, to at least the sublimation temperature of said dihydroquinacridone in the presence of a gaseous mixture inert to said dihydroquinacridone and said quinacridone and collecting said quinacridone pigment.

this invention further provides for the direct preparation of quinacridone and substituted quinacridone in pigmentary particles size. Specific crystal forms of quinacridone can be obtained by subjecting the pigmentary quinacridone so produced to temperatures from 325°–575°C.

The dihydroquinacridone (DQA) starting material employed in the process of this invention includes unsubstituted DQA, substituted DQA, and mixtures thereof. Hereinafter, when the designation DQA is used, it is meant to refer generically to all of the above possibilities, unless otherwise specified. When mixtures of different DQAs are coreacted according to the process of this invention, solid solutions containing the corresponding quinacridones, as well as any unreacted DQA, can be produced. When the DQA starting material is mixed with materials which are inert to dehydrogenation but capable of vaporization at reaction temperatures, solid solutions containing the inert materials can be produced. For example, solid solutions of quinacridone and quinacridonequinone can be produced from a mixture of dihydroquinacridone and quinacridonequinone.

Any vessel, capable of withstanding the reaction temperatures, e.g., 500°C. (sublimation temperature at 1 atmosphere pressure for unsubstituted dihydroquinacridone) and having an opening therein through which gas can pass, can be used to hold the DQA starting material.

For maximum conversion of DQA to quinacridone (QA) by the process of the invention, it is desirable to insure rapid and uniform heating of DQA to effect sublimation. Therefore, DQA is preferably used in the form of a fine powder. To further promote sublimation, it is desirable to provide for agitation of the DQA powder. Any conventional method of agitation can be used, e.g., rotating the reaction vessel, employing a fluidized bed reactor, or spraying the DQA powder into the inert gaseous mixture. A fluidized bed reactor is particularly useful in the process of the invention because it provides for intimate dispersion of the DQA powder in the inert gas, thereby effecting rapid dehydrogenation of DQA at its sublimation temperature.

Any gas or gaseous mixture containing components which are inert to the DQA to be dehydrogenate and the QA produced can be used in the process of the invention. Nitrogen, a common and inexpensive gas, has been successfully used, although other inert gases or mixtures thereof can be used.

The DQA used can be brought to its sublimation temperature by applying heat directly to the DQA itself or by heating the inert gaseous mixture, which is then intimately mixed with the DQA. A combination of both heating methods is preferred because it provides for more uniform and constant heating of the DQA.

The period of time during which sublimed DQA is in contact with the inert gaseous mixture depends primarily on the reaction temperature. Since dehydrogenation of DQA takes place rapidly after DQA is sublimed, reaction temperatures well above the sublimation point of the DQA promote dehydrogenation. Reaction temperatures of 600°–660°C., and preferably 630°–650°C., are used effectively in the process of the invention. At these temperatures at typical time will be betwen 6 to 8 seconds.

Particle size of the QA product is determined primarily by the rate of quenching the hot QA vapor. A preferred method for quenching the hot QA vapor, in order to produce pigmentary particle size, is to contact this vapor with a cool gas or gaseous mixture, having a temperature from 20°–200°C., under conditions of high turbulence. A conventional slot jet quenching tube is particularly useful for introducing quenching gas and generating high turbulence. The quenching gas can be any that does not react with QA under the conditions of this process, e.g., $N_2$ and $CO_2$. Should it be necessary to further retard crystal growth of QA during quenching, vapors of polar solvents and gases such as dimethylformamide, tetramethylsilane and ammonia can be sprayed into the quenching zone. Ammonia at concentrations less than 1 percent by volume is particularly effective in retarding crystal growth.

When the hot QA vapor is rapidly quenched by contact with cool gas, the $\alpha$-form of QA results. The $\beta$-form of QA is produced by annealing the quenched $\alpha$-QA at temperatures of 325°–375°C. for about 0.07 –0.12 seconds. The $\gamma$-form of QA is produced by annealing the quenched α-QA at 475°–525°C. for 4.5–5.0 seconds. The γ-form of QA can also be produced by annealing β-QA at about 550°C.

DESCRIPTION OF DRAWING

In a preferred embodiment of the invention, DQA is heated to 630°–650°C. and exposed to $N_2$ gas, which is preheated to 630°C., for 6–8 seconds, after which the vaporized QA produced is quenched by contact with $N_2$ gas at 20°–200°C. and collected.

The invention will be further illustrated with reference to the drawing.

Referring to FIG. 1, a carrier gas 1, which contains gases inert to DQA, is fed to preheater 2, where it is heated to a temperature above 610°C. and preferably to a temperature of about 630°C. A screw feeder device 3 feeds powdered DQA 4 to gas line 5 whereupon it flows to the base of a fluidized bed reactor 6. The latter contains a bed of inert particles 7, preferably alumina, of about 35 mesh (U.S. Sieve) to provide for heat retention, increased surface area, and proper mixing of the gases and solids. With an average residence time in reactor 6 of 6–8 seconds, the gases and solids exit from the top of reactor 6 to quenching line 8, where precipitation of QA is effected by introduction of quenching gas 9, having been cooled by passage through cooler device 10, and fed via line 11. The quenched gases and the QA particles, shown as 12, may be collected immediately upon precipitation by bag filters or other conventional collecting means or may be discharged into an annealing zone 13, where the particles are heat treated to obtain a predetermined crystal form. The quenched QA particles, upon discharging from the cooling or annealing zone, are collected at collector device 14. An electrostatic precipitator is particularly useful as such a device, but other means such as bag filters can equally well be used.

Figure 1:
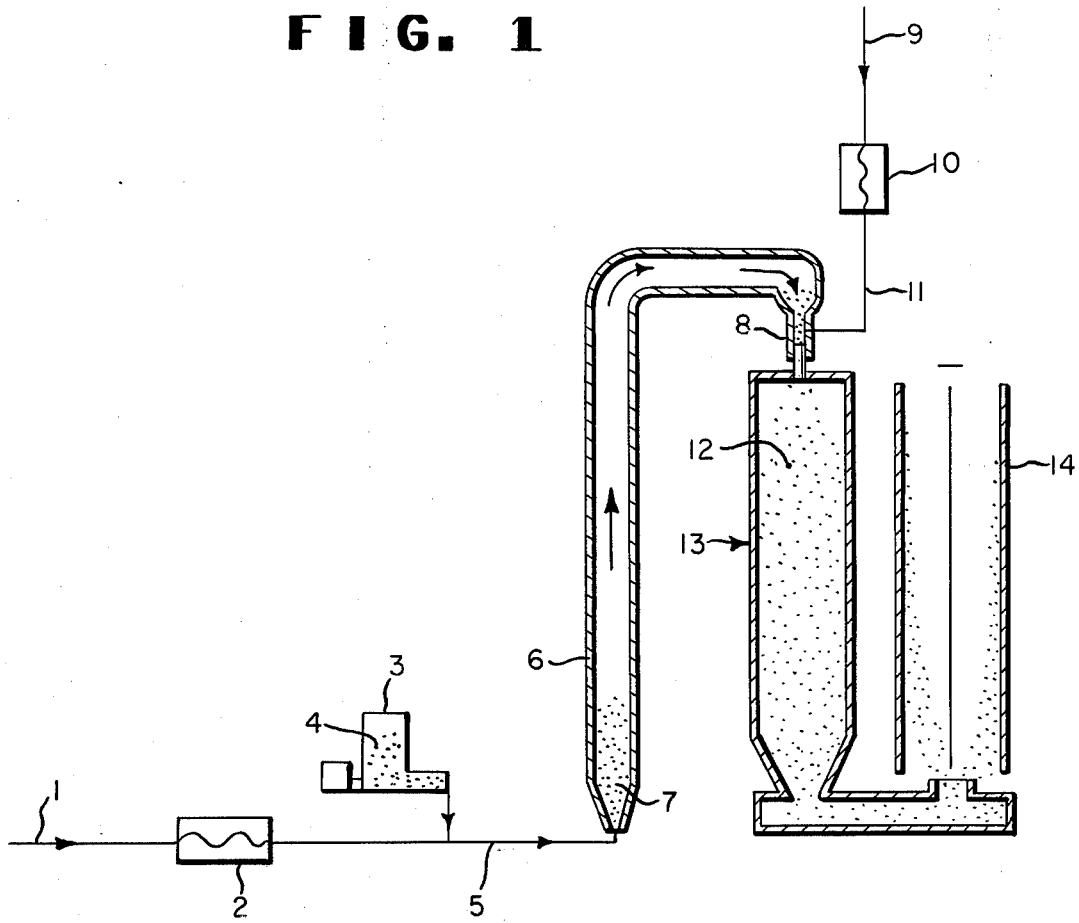
FIG. 1 illustrates, schematically and not to scale, a representative form of laboratory apparatus that can be used for carrying out a preferred embodiment of the invention.

The invention is further illustrated by the following examples.

EXAMPLES

All percent compositions determined in the following examples are by weight unless otherwise specified.

EXAMPLE 1

Preparation of β-quinacridone

Utilizing the apparatus shown in FIG. 1, a flow of carrier gas consisting essentially of $N_2$, preheated to 630°C. is fed under pressure of 10 psig at the rate of 32 ft³/hr through line 5 to carry 2 g of 6,13-dihydroquinacridone per minute to the fluidized bed reactor 6. The reactor contains 35-mesh alumina grains as fluidizing agent and is maintained at 630°–650°C. In this temperature range, dehydrogenation of the dihydroquinacridone is effected with a residence time of 7 seconds. The quinacridone product, by-product gas, and carrier gas from the top of the reactor to the quenching line 8 and are rapidly quenched by mixing with a stream of $N_2$ gas at 25°C. under 10 psig and flowing at 60 ft³/hr. The temperature of the quenching line is maintained at 350°C. After a residence time in the quenching line of 0.008 second, the quenched product is passed to annealing zone 13 having a temperature of 350°C. After a residence time of 0.096 second, the product is collected in an electrostatic precipitator.

The product is analyzed by visible range absorption spectrum and contains 93.6 percent quinacridone, 5.1 percent dihydroquinacridone, and 1.3 percent quinacridonequinone. X-ray diffraction of the product showed the quinacridone to consist essentially of β-quinacridone. The average particle size of the product, determined by conventional electronmicroscopy and X-ray diffraction line-broadening techniques, is 0.1 μ.

If the temperature of the quenching zone were less than 350°C. and the product were immediately collected without annealing, the product would be predominantly α-quinacridone.

EXAMPLE 2

Preparation of γ-quinacridone

The procedure of Example 1 is followed with the following changes: the carrier gas used contains 88 percent nitrogen by volume and 12 percent carbon dioxide by volume, the annealing temperature is 300°C., the residence time in the annealing zone is 3 minutes.

The produce, analyzed by x-ray diffraction, contains predominantly γ-quinacridone.

If the annealing temperature were 550°C. or above, γ-quinacridone would be produced after only 4–5 seconds residence time in the annealing zone.

EXAMPLE 3

Preparation of 2,9-dichloroquinacridone

According to the procedure of Example 1, 2,9-dichloro-6,13-dihydroquinacridone is dehydrogenated. The product is collected directly from the quenching line without annealing. The product is analyzed by visible range absorption spectrum and contains 68.1 percent 2,9-dichloroquinacridone.

EXAMPLE 4

Preparation of 4,11-dichloroquinacridone

According to the procedure of Example 1, 4,11-dichloro-6,13-dihydroquinacridone is dehydrogenated. The product is analyzed by visible range absorption spectrum and contains 67.1 percent 4,11-dichloroquinacridone.

EXAMPLE 5

Preparation of 2,9-dimethylquinacridone

According to the procedure of Example 3, 2,9-dimethyl-6,13-dihydroquinacridone is dehydrogenated. The product is analyzed by visible range absorption spectrum and contains 60.4 percent 2,9-dimethylquinacridone.

EXAMPLE 6

According to the procedure of Example 3, a mixture consisting essentially of 60 percent dihydroquinacridone and 40 percent 2,9-dimethyl-6,13-dihydroquinacridone is dehydrogenated. The product, analysed by X-ray diffraction is found to be a solid solution of approximately 60 percent quinacridone and 40 percent 2,9-dimethylquinacridone.

EXAMPLE 7

According to the procedure of Example 3, a mixture consisting essentially of 60 percent dihydroquinacridone and 40 percent 2,9-dichloro-6,13-dihydroquinacridone is dehydrogenated. The product, analyzed by X-ray diffraction, is found to be a solid solution of approximately 60 percent quinacridone and 40 percent 2,9-dichloroquinacridone.

EXAMPLE 8

According to the procedure of Example 3, a mixture consisting essentially of 60 percent dihydroquinacridone and 40 percent quinacridonequinone is dehydrogenated. The product, analyzed by X-ray diffraction, is found to be a solid solution of approximately 60 percent quinacridone and 40 percent quinacridonequinone.

While the invention has been described with certain detail, it will be apparent that changes can be made without departing from its scope.

What is claimed is:

1. A vapor phase process for preparing quinacridone pigment comprising the step of heating at least one 6,13-dihydroquinacridone of the formula

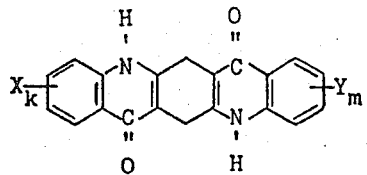

where X and Y are selected from the group consisting of F, Cl, Br, alkyl having 1 to 3 carbon atoms and alkoxy having 1 to 3 carbon atoms, or combinations thereof, and $k$ and $m$ are integers from 0 to 2, inclusive, to a temperature from at least the sublimation temperature thereof to 660°C. in the presence of a gaseous mixture inert to said 6,13-dihydroquinacridone and said quinacridone pigment, and collecting said quinacridone pigment.

2. The process of claim 1 in which the 6,13-dihydroquinacridone is heated to temperatures between 600°C. and 660°C.

3. The process of claim 1 in which the gaseous mixture consists essentially of nitrogen.

4. The process of claim 1 in which the gaseous mixture contains 88 percent by volume of nitrogen and 12 percent by volume of carbon dioxide.

5. The process of claim 1 in which said quinacridone pigment is collected by quenching the reaction vapors with an inert gas having a temperature between 20°C. and 200°C.

6. The process of claim 1, wherein said quinacridone pigment is a solid solution consisting essentially of 2,9-dimethylquinacridone and quinacridone.

7. The process of claim 1, wherein said quinacridone pigment is a solid solution consisting essentially of 2,9-dichloroquinacridone and quinacridone.

8. The process of claim 5 in which said inert gas is nitrogen.

9. The process of claim 5, wherein said quinacridone pigment is unsubstituted quinacridone of the β-form, comprising the additional step of annealing said quinacridone pigment at temperatures between 325°C. and 375°C.

10. The process of claim 9, comprising the additional step of annealing said unsubstituted quinacridone of the β-form at about 550°C. to thereby produce unsubstituted quinacridone of the γ-form.

11. The process of claim 5, wherein said quinacridone pigment is unsubstituted quinacridone of the γ-form, comprising the additional step of annealing said quinacridone pigment at temperatures between 475°C. and 525°C.

* * * * *